United States Patent
Boetius et al.

(10) Patent No.: US 8,136,405 B2
(45) Date of Patent: Mar. 20, 2012

(54) METHOD AND DEVICE FOR MONITORING THE DYNAMIC BEHAVIOR OF A ROTATING SHAFT, IN PARTICULAR OF A GAS OR STEAM TURBINE

(75) Inventors: Joachim Boetius, Berlin (DE); Thomas Borger, Klein-Zimmern (DE); Hans-Günther Sieberling, Hofheim (DE); Raimund Trockel, Mühltal (DE)

(73) Assignee: Siemens Aktiengesellschaft, Munich (DE)

(*) Notice: Subject to any disclaimer, the term of this patent is extended or adjusted under 35 U.S.C. 154(b) by 652 days.

(21) Appl. No.: 11/991,213

(22) PCT Filed: Aug. 2, 2006

(86) PCT No.: PCT/EP2006/064939
§ 371 (c)(1),
(2), (4) Date: Apr. 7, 2009

(87) PCT Pub. No.: WO2007/025830
PCT Pub. Date: Mar. 8, 2007

(65) Prior Publication Data
US 2009/0229367 A1 Sep. 17, 2009

(30) Foreign Application Priority Data
Aug. 31, 2005 (EP) .................................. 05018868

(51) Int. Cl.
*G01M 15/14* (2006.01)

(52) U.S. Cl. ............................... 73/660; 73/593; 73/659

(58) Field of Classification Search ............... 73/660, 73/462, 593, 579, 599, 602, 659, 662
See application file for complete search history.

(56) References Cited

U.S. PATENT DOCUMENTS

| | | | |
|---|---|---|---|
| 4,027,539 A | 6/1977 | Halloran | |
| 4,464,935 A | 8/1984 | McHugh | |
| 4,941,105 A * | 7/1990 | Marangoni | 702/42 |
| 4,977,516 A * | 12/1990 | Shepherd | 700/279 |
| 5,502,650 A * | 3/1996 | Naruse et al. | 700/279 |
| 6,694,816 B2 * | 2/2004 | Matsuoka | 73/593 |
| 6,873,925 B2 * | 3/2005 | Salou et al. | 702/104 |
| 7,650,254 B2 * | 1/2010 | Pecher et al. | 702/113 |
| 2002/0108444 A1 | 8/2002 | Matsuoka | |
| 2008/0226442 A1 * | 9/2008 | Darnis et al. | 415/118 |

FOREIGN PATENT DOCUMENTS

| | | |
|---|---|---|
| JP | 61070218 A | 4/1986 |
| JP | 2002174550 A | 6/2002 |
| JP | 2003149043 A | 5/2003 |

* cited by examiner

*Primary Examiner* — J M Saint Surin

(57) ABSTRACT

The invention relates to a method for monitoring the dynamic behavior, in particular of the oscillating behavior of a rotating shaft, the oscillation being detected by at least two sensors at defined different spatial position, the oscillating behavior in at least one preferred direction being determined from the oscillation. The invention also relates to a device for monitoring oscillating behavior in a rotary machine with rotable parts, having at least two sensors, a shaft and a computing unit, characterized in that the at least two sensors are positioned in a defined spatial position outside the shaft, detect measurement variables which characterize the oscillations and are connected to a computing unit for the transfer of data. The invention also relates to a gas turbine and a steam turbine that use a method and a device as per the invention.

18 Claims, 3 Drawing Sheets

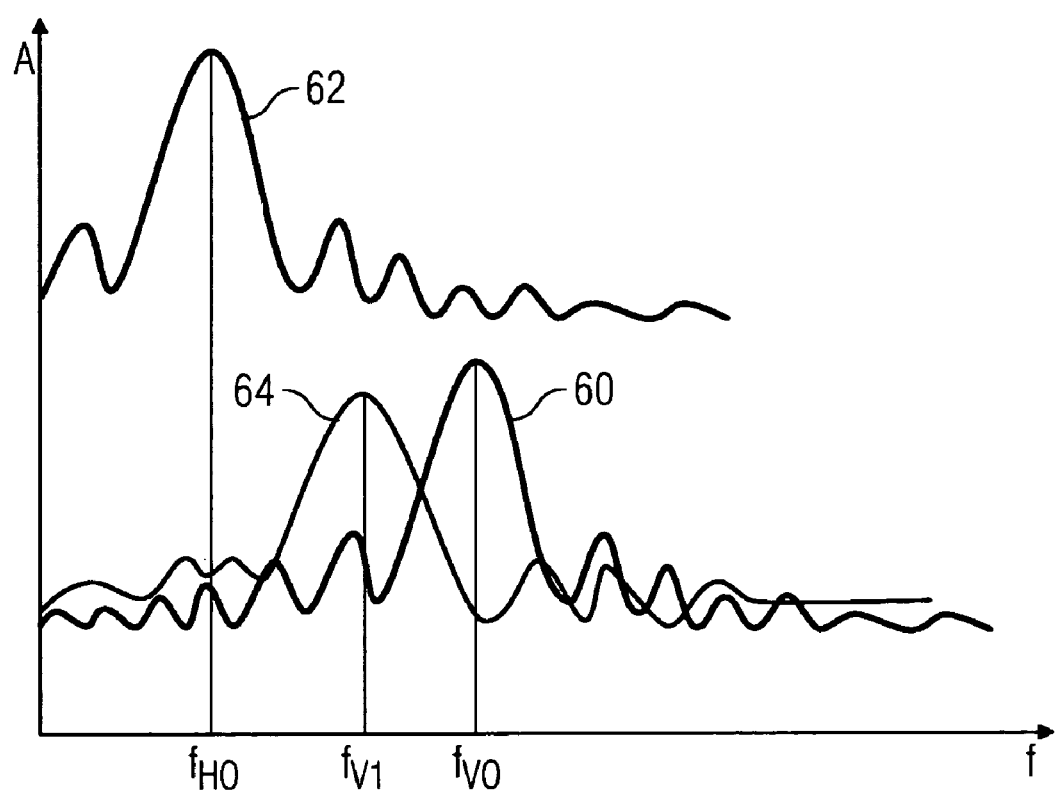

METHOD AND DEVICE FOR MONITORING THE DYNAMIC BEHAVIOR OF A ROTATING SHAFT, IN PARTICULAR OF A GAS OR STEAM TURBINE

CROSS REFERENCE TO RELATED APPLICATIONS

This application is the US National Stage of International Application No. PCT/EP2006/064939, filed Aug. 2, 2006 and claims the benefit thereof. The International Application claims the benefits of European application No. 05018868.9 filed Aug. 31, 2005, both of the applications are incorporated by reference herein in their entirety

FIELD OF INVENTION

The invention relates to a method for monitoring the dynamic behavior, especially of the vibration behavior of a rotating shaft. The invention further relates to a device which especially guarantees the execution of the method.

BACKGROUND OF THE INVENTION

The power generated in a rotating part of a machine, for example in a steam or gas turbine system, is becoming ever higher. With a steam turbine for example, this goes hand in hand with the increase in weight of the rotor and the increase in the distance between the centers. The increased vibrations associated with this are becoming ever more significant for operational maintenance, since vibrations which are too great can result in irreparable damage to the machine. Therefore a limit range is specified within which the vibration values may move. Exceeding these limit values can lead to a shutdown of the entire system.

Frequent starting and stopping of the turbines also leads to abnormal vibrations, which can lead to the machine being damaged. High precision is thus required in monitoring the vibrations.

SUMMARY OF INVENTION

The object of the invention is to specify an improved method for monitoring the vibration behavior of a rotating shaft. A further object is to specify an improved device which especially allows execution of the method. The device and the method are designed for use in a gas turbine as well as a steam turbine.

The object relating to the method is inventively achieved by a method for monitoring the dynamic behavior, especially the vibration behavior of a rotating shaft, with the vibration being detected by at least two sensors at defined different spatial positions and with the vibration behavior of at least one preferred direction being determined from the vibration.

The knowledge underlying the invention is as follows: If the vibration of the shaft exceeds a specific value, this can lead to the machine being switched off or is typically associated with the machine being powered down. This however involves high costs and periods of downtime. If the machine is not switched off in good time, the vibrations cause serious damage to the machine. The vibrations can be measured by sensors. The invention is also based on the knowledge that the different frequency ranges in respective different directions, starting from the center point of the shaft, can cause damage to the machine. The reason for this is that in different frequency ranges the amplitude in the different directions is strongly developed. The frequency range for damage to the machine is thus different in the different directions. This means that vibrations in a specific frequency range thus damage the machine especially in a particular direction, since large amplitudes form at this frequency especially in this direction. For another direction this frequency range represents less of a potential danger in respect of damage caused by vibrations. The invention now starts from the approach of monitoring these vibrations with at least two vibration sensors. These sensors are positioned outside the shaft at different points. In such cases the position of sensors within the space is known. The sensors detect the characteristic measured values of the vibration, for example amplitude and phase of the vibrations. The vibration behavior of the vibration in at least one preferred direction is now determined from this data. Determining the vibrations in at least one preferred direction makes it possible to better delimit the frequency ranges which can lead to serious damage. Early switching off or powering down of the machine is avoided. On the one hand this avoids downtimes and thereby saves money. In addition damage during operation, but also manifestations of wear on the machine exhibiting the vibration anomalies can be detected more easily and at an earlier stage. Thus rapid countermeasures can be taken. This is for example the case if, on powering down the machine a resonant frequency shift into the at least one preferred direction is established.

The object in relation to the device is inventively achieved by a device for monitoring the vibration behavior in a rotatable machine with rotatable parts which features at least two sensors, a shaft and a computation unit, so that the at least two sensors are positioned at a defined spatial position outside the shaft and with the sensors detecting characteristic measured values characterizing the vibrations and being connected to a computation unit for transmission of the data. The device is especially suitable for executing the method described above. The advantages of the method are thus also produced for the device.

In one embodiment, a vibration for an alarm message is lowered by the analysis of the vibration behavior in one direction of a limit value range.

Further features, characteristics and advantages of the invention emerge from the description of an exemplary embodiment and from the further dependent claims.

BRIEF DESCRIPTION OF THE DRAWINGS

The invention will be explained below in greater detail using examples which refer to a drawing.

This is a simplified representation and is not drawn to scale:

FIG. 3 a section of a frequency range of the vibrations in the horizontal and vertical axis.

DETAILED DESCRIPTION OF INVENTION

Figure 1:
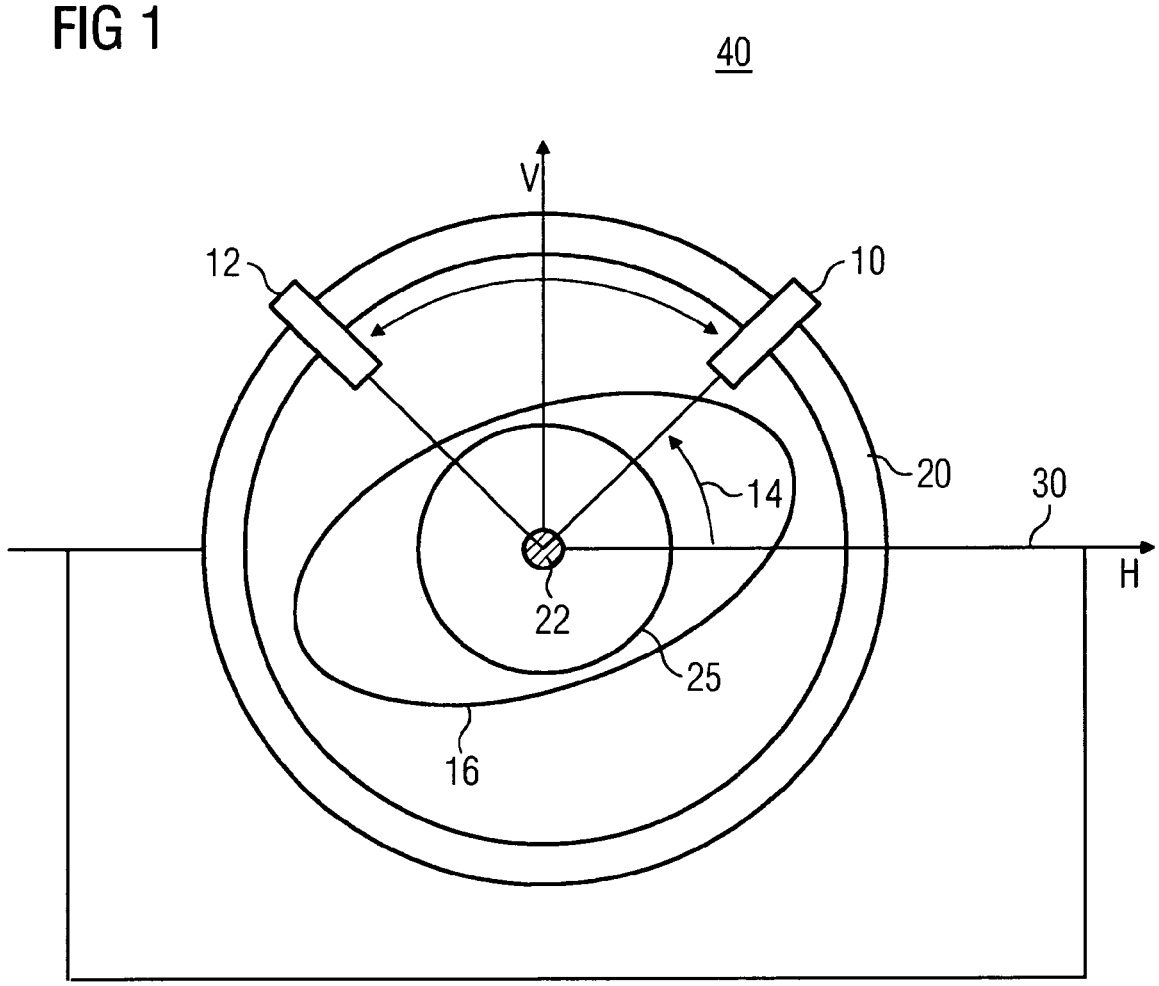
FIG. 1 a shaft with bearing housing, sensors and a vibration

FIG. 1 shows a bearing housing 30, which is attached to a chassis 30 and which further features a turbine shaft 25. Attached to the bearing housing 30 are two sensors 10, 12 preferably spaced at a 90 degree angle from each other.

The machine 40 in this case features two main stiffness axes V, H (orthotropic coordinate system), which in this exemplary embodiment are shown as the vertical direction V and the horizontal direction H. The main stiffness axes V, H coincide with the vertical direction V and the horizontal direction H. The sensors are built in at an angle of $\beta$, 14, to the axis H.

Because of expansion joints for example it is not possible for the sensors to be positioned at any position on the bearing housing 30. Thus the sensors 10, 12 can for example not be mounted in the direction of the stiffness axes V, H of the machine 40. The rotation of the turbine shaft 25 now triggers vibrations. If these exceed a specific limit value there is a danger of the machine sustaining damage. The proportion of the basic vibrations forming the kinetic wave path (orbit) has the form of an ellipse. The vibrations form into an elliptical wave 16. These are picked up by the sensors 10 and 12, box 50 in FIG. 2, and deliver an analog signal. The elliptical wave 16 is uniquely defined by the amplitudes and phases measured by the two sensors, 10, 12.

The elliptical wave 16 is described as follows by four measured values in the Cartesian coordinate system of the sensors as follows:

$$\begin{pmatrix} x(t) \\ y(t) \end{pmatrix} = \begin{pmatrix} A_x \cdot \sin(\omega t + \varphi_1) \\ A_y \cdot \sin(\omega t + \varphi_2) \end{pmatrix}$$

Figure 2:
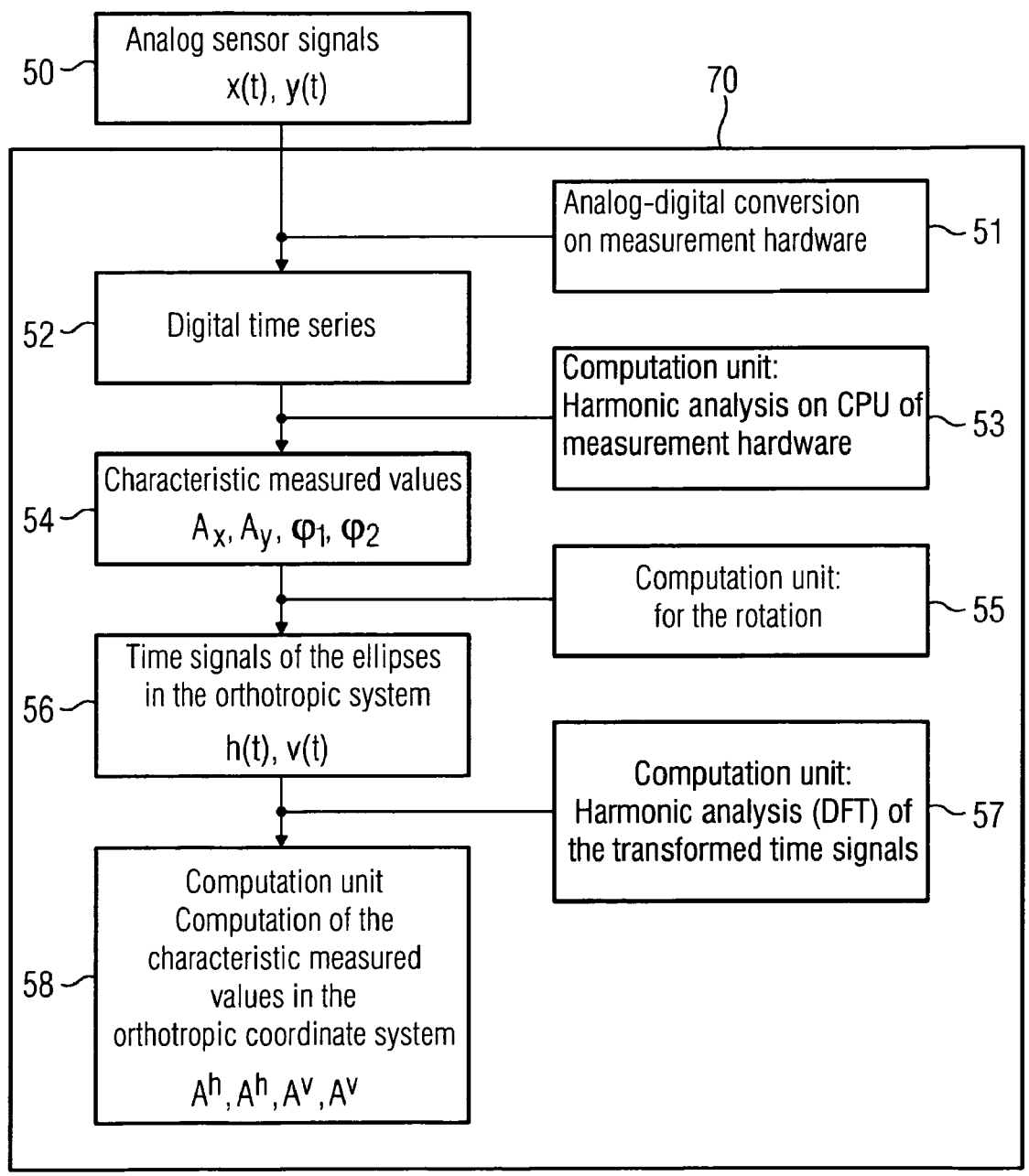
FIG. 2 an exemplary embodiment of the method based on a flowchart.

The analog signal is now converted by means of an analog-digital converter, 51 in FIG. 2, into a digital signal, 52 in FIG. 3. From this the variables relevant for the elliptical wave 16, i.e. essentially the phase and the amplitude, are extracted, computation unit box 53 in FIG. 2. This can be done on the measurement hardware. These variables are available in the coordinate system of the sensors, box 54 in FIG. 2. By means of a computation unit these variables are transformed onto the coordinate system of the main axis of the machine, box 55 in FIG. 2.

This corresponds to a rotation of the above vector from x(t) and y(t) by $-\beta$.

A rotation matrix for the rotation by the angle $-\beta$ has the following shape:

$$\begin{bmatrix} \cos\beta & \sin\beta \\ -\sin\beta & \cos\beta \end{bmatrix}$$

After the rotation the signal can be described in the horizontal (h(t)) and vertical direction (v(t)) as follows, box 56 in FIG. 2:

$$\begin{pmatrix} h(t) \\ v(t) \end{pmatrix} = \begin{pmatrix} A_x \cdot \cos\beta \cdot \sin(\omega t + \varphi_1) - A_y \cdot \sin\beta \cdot \sin(\omega t + \varphi_2) \\ A_x \cdot \sin\beta \cdot \sin(\omega t + \varphi_1) + A_y \cdot \cos\beta \cdot \sin(\omega t + \varphi_2) \end{pmatrix}$$

These signals are fed for analysis to a Discrete Fourier Transformation DFT and the components of the harmonic vector are thus computed, computation unit 57 in FIG. 2.

Typically this appears as follows for the horizontal component. In this case the components are labeled $A_{sin}$ for the sine proportion and $A_{cos}$ for the cosine proportion.

$$A\frac{h}{\sin} = \frac{2}{T}\int_0^T \begin{pmatrix} A_x \cdot \cos\beta \cdot \sin(\omega t + \varphi_1) \cdot \sin\omega t - \\ A_y \cdot \sin\beta \cdot \sin(\omega t + \varphi_1) \cdot \sin\omega t \end{pmatrix} dt$$

$$A\frac{h}{\cos} = \frac{2}{T}\int_0^T \begin{pmatrix} A_x \cdot \cos\beta \cdot \sin(\omega t + \varphi_1) \cdot \cos(\omega t) - \\ A_y \cdot \sin\beta \cdot \sin(\omega t + \varphi_2) \cdot \cos(\omega t) \end{pmatrix} dt$$

with: $T = \frac{2\pi}{\omega}$

For the evaluation it is helpful to compute the following integrals:

$$\frac{2}{T}\int_0^T (a \cdot \sin(\omega t + \varphi) \cdot \sin\omega t) dt =$$

$$\frac{2a}{T}\int_0^T ((\sin(\omega t) \cdot \cos\varphi + \cos(\omega t) \cdot \sin\varphi) \cdot \sin\omega t) dt =$$

$$\frac{2a}{T}\int_0^T \sin^2(\omega t) \cdot \cos\varphi\, dt = a \cdot \cos\varphi$$

Likewise $$\frac{2}{T}\int_0^T (a \cdot \sin(\omega t + \varphi) \cdot \cos\omega t) dt =$$

$$\frac{2a}{T}\int_0^T ((\sin(\omega t) \cdot \cos\varphi + \cos(\omega t) \cdot \sin\varphi) \cdot \cos\omega t) dt =$$

$$\frac{2a}{T}\int_0^T \cos^2(\omega t) \cdot \sin\varphi\, dt = a \cdot \sin\varphi$$

If these results are used the individual components can be determined, computation unit 58 in FIG. 2:

$$A\frac{h}{\sin} = \frac{2}{T}\int_0^T \begin{pmatrix} A_x \cdot \cos\beta \cdot \sin(\omega t + \varphi_1) \cdot \sin\omega t - \\ A_y \cdot \sin\beta \cdot \sin(\omega t + \varphi_1) \cdot \sin\omega t \end{pmatrix} dt =$$

$$A_x \cdot \cos\beta \cdot \cos\varphi_1 - A_y \cdot \sin\beta \cdot \cos\varphi_2)$$

$$A\frac{h}{\cos} = \frac{2}{T}\int_0^T \begin{pmatrix} A_x \cdot \cos\beta \cdot \sin(\omega t + \varphi_1) \cdot \cos(\omega t) - \\ A_y \cdot \sin\beta \cdot \sin(\omega t + \varphi_2) \cdot \cos(\omega t) \end{pmatrix} dt =$$

$$A_x \cdot \cos\beta \cdot \sin\varphi_1 - A_y \cdot \sin\beta \cdot \sin\varphi_2)$$

$$A\frac{v}{\sin} = \frac{2}{T}\int_0^T \begin{pmatrix} A_x \cdot \sin\beta \cdot \sin(\omega t + \varphi_1) \cdot \sin\omega t + \\ A_y \cdot \cos\beta \cdot \sin(\omega t + \varphi_2) \cdot \sin\omega t \end{pmatrix} dt =$$

$$A_x \cdot \sin\beta \cdot \cos\varphi_1 + A_y \cdot \cos\beta \cdot \cos\varphi_2)$$

$$A\frac{v}{\cos} = \frac{2}{T}\int_0^T \begin{pmatrix} A_x \cdot \sin\beta \cdot \sin(\omega t + \varphi_1) \cdot \cos\omega t + \\ A_y \cdot \cos\beta \cdot \sin(\omega t + \varphi_2) \cdot \cos\omega t \end{pmatrix} dt =$$

$$A_x \cdot \sin\beta \cdot \sin\varphi_1 + A_y \cdot \cos\beta \cdot \sin\varphi_2)$$

The parameters of the elliptical wave 16 are computed in the direction of the main axis V, H of the machine by the DFT. These are essentially the amplitude and the phase in the main axis directions V, H. By splitting up the characteristic values of the elliptical wave 16 on the main stiffness axes H,V of the machine 40 the resonance areas are determined in the main axis directions V, H. With this improved analysis the critical frequency range harmful to the machine can be determined and limited.

Switching off the machine 40 too early, which is associated with high costs, is avoided. The continuous monitoring also enables rapid intervention if there is a danger of damage to the machine, which is especially of importance when the machine is being switched on or switched off. In addition damage caused by wear to the machine or machine damage itself can be more easily detected.

In FIG. 3 the different frequencies of the machine 40 in the direction of stiffness axes V,H are illustrated schematically within a frequency range. In this case the frequencies f are plotted as a function of the amplitude A. The two axes H and V exhibit a maximum at different frequencies, in this case 62 establishes the frequency F as a function of the amplitude A in the direction of axis H, 60 establishes the frequency F as a function of the amplitude A in the direction of axis V. Thus the frequency-related critical area, the resonant frequency, can be better determined. If the machine 40 is in operation a displacement of the critical area can occur. Determining the vibrations in the directions of two of the main stiffness axes V,H allows determination of how the critical areas have shifted. FIG. 3 shows a displacement 64 of the critical area in the vertical direction. The resonant frequency shifts in this case from $f_{V_0}$ to $f_{V_1}$. This enables damage or manifestations of wear at the machine to be more easily detected and suitable countermeasures to be rapidly deployed.

The invention claimed is:

1. A method for monitoring the vibration behavior of a rotating shaft associated with a machine, comprising:
    arranging a first vibration sensor at a first defined spatial position;
    arranging a second vibration sensor at a further defined spatial position that differs from the first defined spatial position;
    detecting a vibration of the rotating shaft by the first and second sensors; and
    determining the vibration behavior of at least one preferred direction which differs from the spatial positions of the sensors based on the detected vibration wherein the vibration behavior of two different preferred directions are determined and wherein the two preferred directions coincide with main stiffness axes of the machine.

2. The method as claimed in claim 1, wherein one of the main axes coinciding with one of the two preferred direction is firmly supported on a chassis and a bearing housing of the machine.

3. The method as claimed in claim 2, wherein the vibration behavior of the shaft is determined by amplitude and phase of the vibration.

4. The method as claimed in claim 3, wherein the vibration for the alarm message is lowered by the analysis of the vibration behavior in one direction of the limit value range.

5. The method as claimed in claim 4, wherein the vibration is continuously evaluated by analog vibration sensors that generate analog sensor signals.

6. The method as claimed in claim 5, wherein the analog sensor signals are converted into digital time series.

7. The method as claimed in claim 6, wherein a harmonic analysis of the digital time series is undertaken.

8. The method as claimed in claim 7, wherein characteristic values of the vibration determined by the harmonic analysis are transformed onto the main axes directions and fed to a discrete Fourier analysis.

9. The method as claimed in claim 8, wherein the method is applied for a steam or gas turbine.

10. A device for monitoring a vibration behavior in a rotatable machine, comprising:
    a shaft rotatably supported;
    a plurality of sensors arranged at a defined spatial position outside the shaft where the plurality of sensors measure rotor vibration and provide measured values of the rotor vibration; and
    a computation unit connected to the plurality of sensors that receives the measured values of the rotor vibration and computes the vibration behavior of the rotor in at least one preferred direction that is different from the spatial positions of the sensors wherein the vibration behavior of two different preferred directions are determined and wherein said two preferred directions coincide with main stiffness axes of the machine.

11. The device as claimed in claim 10, wherein the sensors are attached to the bearing housing.

12. The device as claimed in claim 11, wherein the sensors provide an analog measured value signal that is converted to a digital signal by an analog to digital converter comprised in the computation unit.

13. The device as claimed in claim 11, wherein the sensors comprise an analog to digital converter and transmit a digital signal.

14. The device as claimed in claim 13, wherein the computation unit comprises a plurality of computation units for analytical computations.

15. The device as claimed in claim 14, wherein the computation unit comprises an alarm system.

16. A turbine, comprising:
    a rotational rotor arranged along a rotational axis of the turbine;
    a stationary stator arranged coaxially and at least partially surrounding the rotor;
    a plurality of sensors arranged at a defined spatial position outside the rotor where the plurality of sensors measure vibration of the rotor and provide measured values of the rotor vibration; and
    a computation unit connected to the plurality of sensors that receives the measured values of the rotor vibration and computes the vibration behavior of the rotor in at least one preferred direction that is different from the spatial positions of the sensors wherein the vibration behavior of two different preferred directions are determined and wherein said two preferred directions coincide with main stiffness axes of the machine.

17. The turbine as claimed in claim 16, wherein the turbine is a steam turbine.

18. The turbine as claimed in claim 17, wherein the turbine is a gas turbine.

* * * * *